United States Patent
Bee et al.

(10) Patent No.: US 12,459,151 B2
(45) Date of Patent: Nov. 4, 2025

(54) TOOL SET FOR MANUFACTURING ADHESIVE PATCHES, METHOD OF MANUFACTURING AN ADHESIVE PATCH AND ADHESIVE LAYERING

(71) Applicants: LTS Lohmann Therapie-Systeme AG, Andernach (DE); KM Transderm Ltd., Osaka (JP)

(72) Inventors: Markus Bee, Ketting (DE); Helena Gallinger, Koblenz (DE); Alexander Saifert, Andernach (DE); Andreas Weber-Stebliwez, Andernach (DE); Georg Schlögel, Andernach (DE); Akio Nishiura, Osaka (JP); Akinori Sasaki, Osaka (JP); Masaoki Goto, Takasago (JP)

(73) Assignees: LTS Lohmann Therapie-Systeme AG, Andernach (DE); KM Transderm Ltd., Osaka (JP)

( * ) Notice: Subject to any disclaimer, the term of this patent is extended or adjusted under 35 U.S.C. 154(b) by 1011 days.

(21) Appl. No.: 17/613,542

(22) PCT Filed: May 26, 2020

(86) PCT No.: PCT/EP2020/064527
§ 371 (c)(1),
(2) Date: Nov. 23, 2021

(87) PCT Pub. No.: WO2020/239738
PCT Pub. Date: Dec. 3, 2020

(65) Prior Publication Data
US 2022/0258374 A1    Aug. 18, 2022

(30) Foreign Application Priority Data

May 27, 2019 (EP) ..................................... 19176758

(51) Int. Cl.
*B26F 1/40* (2006.01)
*A61F 13/02* (2024.01)
(Continued)

(52) U.S. Cl.
CPC ............ *B26F 1/40* (2013.01); *A61F 13/0276* (2013.01); *B26D 7/1818* (2013.01); *B26F 1/382* (2013.01); *B26F 2001/4418* (2013.01)

(58) Field of Classification Search
CPC ............ G02F 1/133603; A61F 13/0276; B26F 1/382; B26F 1/40; B26F 2001/4418; B26D 7/1818
See application file for complete search history.

(56) References Cited

U.S. PATENT DOCUMENTS

| | | | |
|---|---|---|---|
| 6,059,913 | A | 5/2000 | Asmussen et al. |
| 8,273,370 | B2 | 9/2012 | Harima et al. |

(Continued)

FOREIGN PATENT DOCUMENTS

| | | |
|---|---|---|
| CN | 108724335 A | 11/2018 |
| CN | 108789643 A | 11/2018 |

(Continued)

OTHER PUBLICATIONS

Translation of CN108472825.*
Translation of WO2011046023.*

*Primary Examiner* — Sonya M Sengupta
(74) *Attorney, Agent, or Firm* — The Webb Law Firm

(57) ABSTRACT

A tool set for manufacturing adhesive patches, by processing laminate web. The tool set includes a cutting tool having a cutting face lying in a cutting plane, and an embossing tool having a pressing face lying in a pressing plane, where the cutting plane and the pressing plane are parallel. The embossing tool is configured to press an edge area shape of the adhesive patch to be manufactured, and the cutting tool (Continued)

is configured to cut out the adhesive patch to be manufactured by cutting in edge area or outside the edge area. Furthermore, a method of manufacturing adhesive patches. The method essentially includes a feeding step, a pressing step and cutting step. Lastly an adhesive layering having a backing layer and an adhesive matrix layer. The backing layer having a larger size than the adhesive matrix layer.

17 Claims, 9 Drawing Sheets

(51) Int. Cl.
  *B26D 7/18* (2006.01)
  *B26F 1/38* (2006.01)
  *B26F 1/44* (2006.01)

(56) References Cited

U.S. PATENT DOCUMENTS

| | | |
|---|---|---|
| 2005/0275130 A1 | 12/2005 | Su et al. |
| 2008/0172015 A1 | 7/2008 | Okada et al. |
| 2008/0302255 A1 | 12/2008 | Koivukunnas |
| 2010/0221313 A1 | 9/2010 | Smith et al. |
| 2014/0142490 A1 | 5/2014 | Johannison |
| 2014/0204309 A1* | 7/2014 | Sakurai ............. G02F 1/133603 349/61 |
| 2022/0258374 A1* | 8/2022 | Bee ..................... B26D 7/1818 |

FOREIGN PATENT DOCUMENTS

| | | |
|---|---|---|
| EP | 2158885 B1 | 8/2011 |
| EP | 3094468 B1 | 1/2020 |
| JP | 200037413 A | 2/2000 |
| JP | 2010053065 A | 3/2010 |
| JP | 2016140972 A | 8/2016 |
| JP | 2017509549 A | 4/2017 |
| JP | 2018118485 A | 8/2018 |
| WO | 2007017576 A1 | 2/2007 |
| WO | 2013009239 A1 | 1/2013 |

* cited by examiner

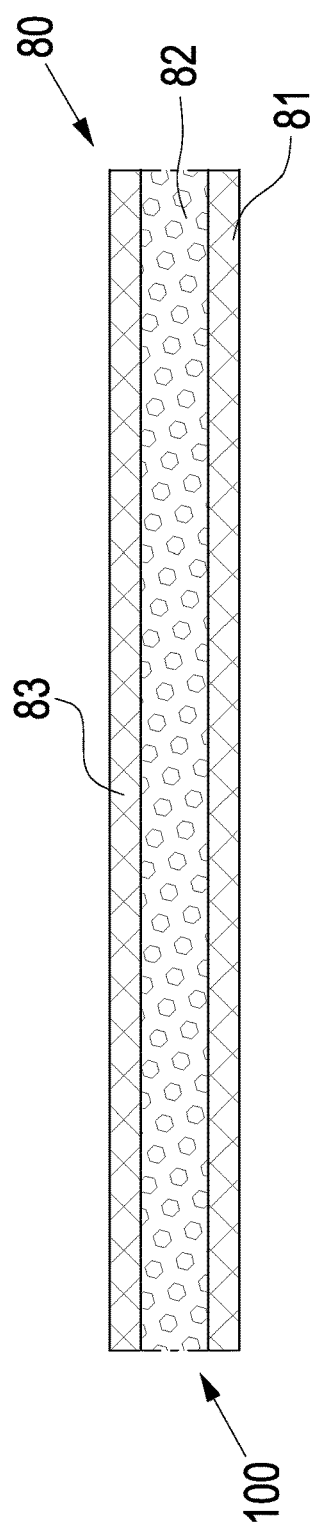
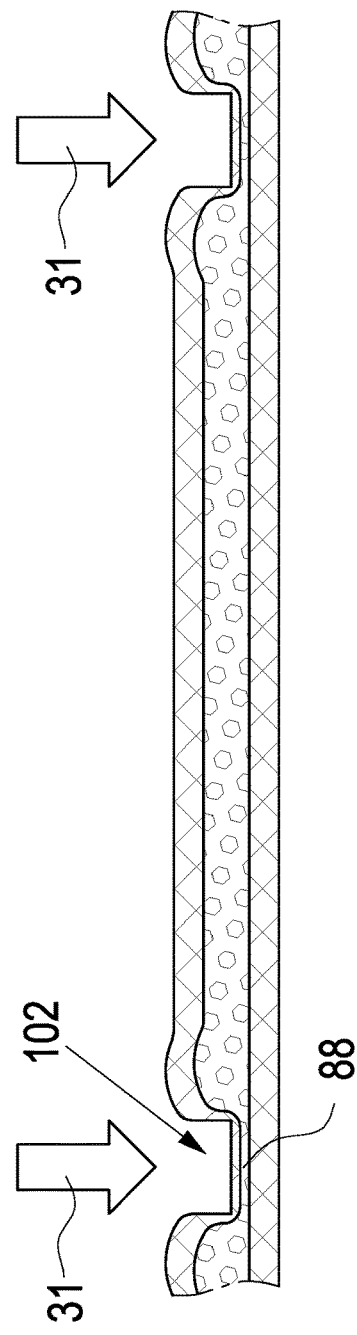
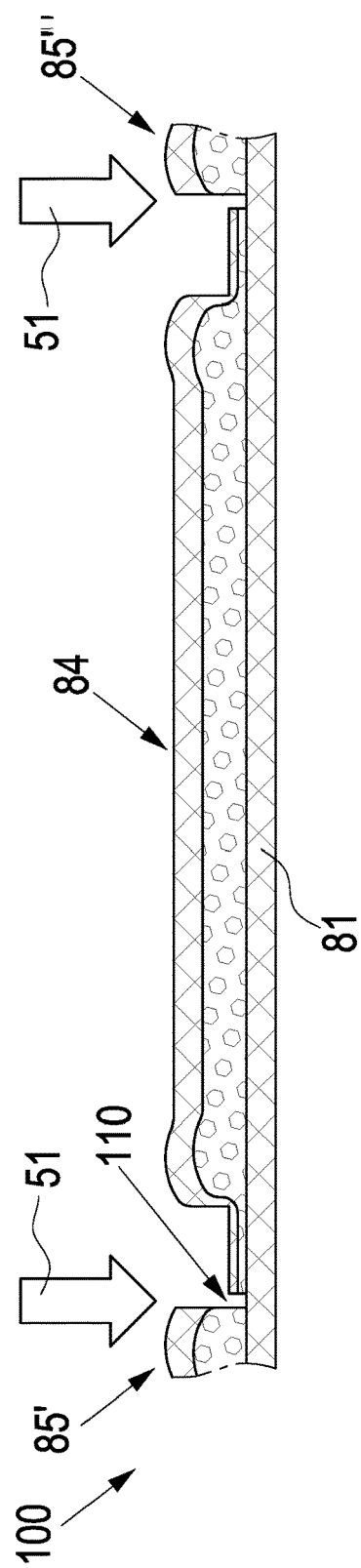

TOOL SET FOR MANUFACTURING ADHESIVE PATCHES, METHOD OF MANUFACTURING AN ADHESIVE PATCH AND ADHESIVE LAYERING

CROSS-REFERENCE TO RELATED APPLICATIONS

This application is the United States national phase of International Application No. PCT/EP2020/064527 filed May 26, 2020, and claims priority to European Patent Application No. 19176758.1 filed May 27, 2019, the disclosures of which are hereby incorporated by reference in their entirety.

BACKGROUND OF THE DISCLOSURE

The disclosure relates to an adhesive layering, in particular a transdermal adhesive layering. Furthermore, the disclosure relates to an adhesive patch intermediate product, in particular transdermal patch intermediate product as well as an adhesive patch product, in particular transdermal patch, comprising such an adhesive layering. Besides that, the disclosure relates to a tool set for manufacturing adhesive patches, in particular transdermal patches. Lastly, the disclosure relates to a method of manufacturing adhesive patches, in particular transdermal patches.

DESCRIPTION OF RELATED ART

A common area of application of adhesive layering is in the field of adhesive patches, specifically transdermal patches. Transdermal patches are medicated adhesive patches that are placed on the skin to deliver a specific dose of medication on and/or through the skin and into the blood-stream.

Such transdermal patches usually comprise at least a backing layer with an adhesive matrix having a drug arranged thereon. The transdermal patch is adhered to the skin with the adhesive matrix, wherein the backing layers serves to protect the patch from the outer environment.

Several issues arise in the context of adhesive patches, particularly transdermal patches.

One major issue experienced in the application of such patches is that exposed and/or escaping adhesive matrix material comes into contact with the environment. In particular, it is frequently experienced that adhesive matrix material comes into contact with objects, especially the clothing of the user. On the one hand, this leads to, particularly adhesive, contamination of the objects, especially the clothing. On the other hand, it is possible that the patch sticks to the object via the exposed adhesive matrix material. Here, the patch might happen to be shifted or separated from the skin, for example if the objected is moved.

Another issue is the exposure of the adhesive matrix itself, which particularly leads to an exposure of the drug components to environmental impact. Hereby it is possible that active components are affected. Further, at least parts of the adhesive matrix might be separated from the patch. This can lead to inaccurate and/or failing administration of the drug.

SUMMARY OF THE DISCLOSURE

It is an object of the disclosure to provide an adhesive layering, in particular a transdermal adhesive layering, wherein exposure of the adhesive matrix to the environment is prevented. A further object of the disclosure is to provide a method for manufacturing adhesive patches, in particular transdermal patches, wherein the adhesive matrix is protected from exposure to the environment. Besides that, it is an object to provide a tool set to for manufacturing adhesive patches, wherein the adhesive matrix is protected from exposure to the environment These objects are achieved by an adhesive layering defined by claim 9, a method as defined by claim 6 as well as a tool set as defined by claim 1.

The adhesive layering according to the disclosure is in particular a transdermal adhesive layering. The adhesive layering comprises a backing layer as well as an adhesive matrix layer, wherein the adhesive matrix layer is arranged on one side of the backing layer. In particular, the adhesive matrix layer is arranged on the bottom side of the backing layer. Thus, it is preferred that the backing layer is a top layer and the adhesive matrix is a bottom layer of the adhesive layering. The adhesive matrix layer comprises adhesive matrix material. The adhesive matrix material comprises preferably an adhesive material, and/or an active ingredient like a drug or a drug composition. The backing layer has a larger size, particularly a larger dimension, more particular a larger perimeter than the adhesive matrix layer. In other words, it is preferred that the backing layer is only covered partly with the adhesive matrix layer. For example, the edge area of the backing layer is not covered with the adhesive matrix layer. Nevertheless, it is still possible that the area of the backing layer which is not covered with the adhesive matrix layer comprises adhesive matrix material, wherein however it is preferred that this area comprises less, particularly significantly less, adhesive matrix material than the adhesive matrix layer. The adhesive layer may have essentially a rectangular or elliptical, particularly circular or oval, shape, wherein it is preferred that the backing layer and/or the adhesive matrix layer has such a shape. Preferably, sharp-edged embossing shapes should be avoided.

The width of the adhesive matrix layer is for example between 30 mm to 75 mm, particularly 50 mm. The adhesive matrix layer has a height or thickness for example between 100 micrometers and 500 micrometers. The elongation at break of the adhesive matrix layer 82 is for example greater than 50%; it is for example between 50% and 100%. The modulus of elasticity of the adhesive matrix layer is for example less than 30 Newton per square millimeter.

The backing layer can comprise, or consists of, polyethylene terephthalate (PET). It has a height or thickness of for example 23 micrometers. Its tearing strength is for example 50 Newton per centimeter. The tearing strength, which is the length-related force at which a tear starts, is preferably between 100 Newton per centimeter and 140 Newton per centimeter. The elongation at break is for example between 80% and 120%.

In a preferred embodiment the backing layer overlaps the adhesive matrix layer, wherein particularly the backing layer completely overlaps the adhesive matrix layer.

It is preferred that the overlapping area of the backing layer is an edge area of the backing layer. The edge area, particularly the complete edge area, is in contact with, particularly significantly, less or none of adhesive matrix material than the rest of the backing layer. Preferably the adhesive matrix material of the adhesive matrix layer edge area is pressed out of the edge area, thereby leaving none or just a small rest portion of adhesive matrix material in the edge area. Particularly the edge area is the periphery of the backing layer. The overlapping area and/or the edge area particularly overlaps the adhesive matrix by around 0.3 mm to 1.3 mm, more particular 0.5 mm.

In a preferred embodiment the overlapping area covers the perimeter of the adhesive matrix layer. In other words, it is preferred that the overlapping area of the backing layer encases the outside of the adhesive matrix layer at the perimeter. Additionally or alternatively, the overlapping area is bent or folded around the adhesive matrix layer, particularly around the perimeter of the adhesive matrix layer. It is preferred that the perimeter is the circumference of the adhesive matrix layer. In this context the perimeter can be understood as contour.

Particularly, the area of the adhesive layering in the overlapping area, particularly in the edge area, of the backing layer; and/or the overlapping area, particularly the edge area, of the backing layer has an embossing or a pressing. Therefore, the overlapping area is preferably embossed or pressed. The embossing optionally can be defined as a squeezing. This embossing is preferably generated by embossing or pressing, particularly stamping, the adhesive layering in the overlapping area. Thereby, it is preferred that in the overlapping area, adhesive matrix material of the adhesive matrix layer is compressed and/or squeezed out. Particularly, the embossing generates the covering and/or bending of the backing layer around the adhesive matrix layer. In other words, it is preferred that the edge area of the adhesive layering is compressed and/or embossed.

In a preferred embodiment the adhesive layering has the shape of a final adhesive patch for medical application, particularly of a transdermal patch. It is preferred that the shape of the adhesive patch for medical application, is generated by cutting a laminate web made of the adhesive layering. Particularly, cutting is performed in the overlapping area or on the outside of the overlapping area, preferably on the outer perimeter of the overlapping area. It is thus preferred that this adhesive layering is in the shape of a transdermal patch, wherein the edge area and/or the perimeter of the adhesive layering is embossed. In particular, the adhesive layering of this definition is a cutout and/or a punch-out of a laminate web made of the adhesive layering. In other words, the adhesive layering of this definition is an adhesive layering in a specific shape, which is cut and/or punched from a larger (the same) adhesive layering. An adhesive layering in shape of final adhesive patch is referred to as final adhesive patch or adhesive patch throughout this text.

Advantages of the adhesive layering according to the invention are, on the one hand, that the adhesive layering comprises a perimeter and/or an edge area having none or significantly less adhesive matrix material. On the other hand, by providing a covered edge area, the adhesive matrix material is shielded from the environment. Therefore, exposure to the environment is minimized. For example, the risk of adhesive matrix material sticking to clothing, etc. is thus prevented.

Another disclosure herein is an adhesive patch intermediate product, in particular a transdermal patch intermediate product. The intermediate product particularly represents a base product for manufacturing a final adhesive patch. The adhesive patch intermediate product is for example an intermediate product comprising multiple adhesive patches, which can be separated to have individual adhesive patches and/or is an intermediate product in the state before packaging. This adhesive patch intermediate product comprises at least one, particularly multiple adhesive layering(s) with one or more features of the adhesive layering as defined above. Preferably, the one or more adhesive layerings have the shape and/or dimensions of a final adhesive patch, in particular a transdermal patch. Furthermore, the adhesive patch intermediate product comprises a support layer. Particularly, the support layer is continuous. For example, the support layer may be a web, preferably a roll web. At least one, particularly multiple, adhesive layering(s) are arranged on the support layer. Preferably, one or more adhesive layering(s) in the shape and/or in the dimensions of final adhesive patches, particularly of transdermal patches, are arranged on a single support layer. The adhesive matrix of the adhesive layering(s) is arranged between the support layer and the backing layer of the adhesive layering(s). For example, the intermediate product has a laminate web comprising an adhesive layering having a backing layer and a matrix layer; as well as a support layer, as basic material. The adhesive layering particularly has a specific shape, more particular the shape of a final adhesive patch, wherein the support layer however is preferably in its original, continuous shape, which can also be found on the laminate web.

The support layer particularly has a height or thickness between 75 micrometers and 100 micrometers. The width of the support layer is for example 75 millimeters. The support layer preferably comprises or consists of polyethylene terephthalate (PET). The support layer is provided for example with adhesive properties, particularly coated with a adhesive coating.

Besides that, it is preferred that the adhesive patch intermediate product comprises a trellis of adhesive layering. In particular said trellis is cutting scrap remaining when cutting and/or punching out the final adhesive patches from an adhesive layering, particularly of a laminate web.

Preferably the overlapping area, particularly the edge area, is in loose contact with the support layer. Loose contact is defined a contact between the overlapping area and the support layer which is detachable, particularly peelable. In the manufacturing of adhesive patches, multiple adhesive layerings can be arranged on a support layer. In a next step those adhesive layerings can be separated from the support layer and then be transferred. Particularly the adhesive layerings can be transferred individually to a release liner and/or be packaged. The support layer thus represents a sort intermediate carrier or intermediate conveyor or the like. Therefore, it is required that the adhesive layerings, particularly the overlapping area, can be easily detached from the support layer. The connection between the overlapping area and the support layer is thus carried out merely by a pressed connection and/or by a connection via a thin layer of adhesive matrix material.

Another disclosure herein is an adhesive patch product, preferably a transdermal patch product. The adhesive patch product comprises an, particularly one single, adhesive layering with one or more features of the adhesive layering as defined above. The adhesive patch product preferably represents a final adhesive patch product, for example, to be sold individually or bundled. It is preferred that the adhesive layering of the adhesive patch product has the shape and/or dimensions of the final adhesive patch product. Furthermore, the adhesive patch product comprises a release liner. The release liner particularly is a release liner which is separable, particularly peelable, from the adhesive layering before application. Said release liner preferably is a liner which is separated, particularly peeled, before application of the adhesive patch to a user's skin. Particularly, the release liner has the same shape and/or dimensions as the adhesive layering. More particular, the release liner has a larger size than the adhesive layering. The release liner may be split and/or comprise non-adhesive areas to allow easier peeling.

The adhesive matrix of the adhesive layering is arranged between the release liner and the backing layer of the adhesive layering.

Preferably, the overlapping area, particularly the edge area, is in loose contact with the release liner. This loose contact is preferably defined as a loose contact with one or more features of the loose contact described above in the context of the adhesive patch intermediate product.

In a preferred embodiment the adhesive patch product comprises a packaging having particularly a bottom pouch layer and a top pouch layer. The pouch layers are particularly connected, more particularly sealed circumferentially, to form a closed pouch packaging.

Another disclosure herein is a tool set for manufacturing adhesive patches, in particular transdermal patches, preferably by processing a laminate web. It is preferred that the laminate web comprises an adhesive layering with one or more features of the adhesive layering as defined above. The tool set comprises a cutting tool having a cutting face lying in a cutting plane. The cutting face is particularly a cutting edge, more particular a thin cutting edge. Furthermore, the tool set has an embossing tool having a pressing face lying in a pressing plane. The pressing face is particularly a pressing surface, more particular a flat pressing surface. In other words, the pressing face has particularly the shape and/or cross section of a hollow cylinder, more particular of a round hollow cylinder. Alternatively, the embossing tool may also be defined as a pressing tool. The cutting plane and the pressing plane are parallel to each other. The embossing tool is configured to press, particularly stamp, an edge area shape, also definable as the perimeter of the adhesive patch to be manufactured. Therein it is preferred that the embossing tool is configured to compress a contour or perimeter of the adhesive patch to be manufactured, for example on the laminate web. For example, the embossing tool comprises, particularly consists of, an embossing stamp or an embossing stamp head. The embossing is preferably performed by strokes. Nevertheless, the embossing tool may, for example, also comprise or consist of an embossing roll, or the like. In particular, the width of the pressing face is around 0.3 mm to 1.25 mm, more particular 0.5 mm. Besides that, the cutting tool is configured to cutout the adhesive patch to be manufactured particularly by cutting in or outside the edge area, preferably on the outer perimeter of the edge area. Thus, for example, the cutting tool has a larger cutting perimeter than the embossing perimeter of the embossing tool. These perimeters are in particular inner perimeters. Cutting is preferably performed on the laminate web. The cutting tool is in particular a punching tool, which more particularly operates in a stroking manner. Again, it is nevertheless possible that the cutting tool comprise or consist of, for example, a cutting roll, or the like.

In a preferred embodiment the cutting tool and the embossing tool are moveable coaxially, particularly in a stroking manner. Preferably, the cutting face is arranged circumferential to the pressing face. In other words, it is preferred that the cutting face encircles the pressing face. Such is achieved, for example, by arranging the embossing tool within the cutting tool. It is preferred that the cutting tool is arranged closely to the outer perimeter of the embossing tool. Thus, cutting can be performed on the outer perimeter of the compressed edge area.

In a preferred embodiment the cutting face and/or the pressing face has a ring shape, in particular a round or rectangular ring shape. Specifically, the ring may have a circular, oval or square shape. Thus, it is preferred that the cutting tool and/or the embossing tool is symmetrical, more particular rotationally symmetric.

Particularly, the cutting tool and the embossing tool are coaxially moveable relative to each other. Thus, cutting and embossing can be performed separately, for example during individual movements of the embossing tool and the cutting tool. For example, embossing can be performed first and, after embossing or during a lasting embossing, cutting can be performed. Alternatively, the cutting tool and the embossing tool are fixed to each other. In view of that, cutting and embossing can be performed by jointly moving the cutting tool and the embossing tool.

In a preferred embodiment, the cutting face and/or the pressing face have a recessed height offset in the cutting position, preferably in the maximum stroke deflection position to a base plane. The base plane is, particularly, a plane whereon the laminate web, and/or a support layer and the laminate web is arranged. Thus, if the laminate to be processed is arranged on the base plane, the cutting face and/or the pressing face do not reach up to the base plane, thereby preventing a full cutting and/or pressing of the whole laminate web. For example, it is therefore possibly to cut and/or press only specific parts and/or layers of the laminate web. In particular it is preferred to cut only the backing layer and preferably the adhesive matrix. Cutting is therefore more particularly performed by cutting up to the support layer, preferably without cutting into and/or damaging the support layer.

In particular, the cutting face has a protruding height offset in relation to the pressing face at least in the cutting position, preferably in the maximum stroke deflection position. Based on that, it is preferred that the cutting face, as compared to the pressing face, can penetrate deeper, for example into the laminate. Preferably, the height offset of the cutting face in relation to the pressing face corresponds to the height of the backing layer of the laminate web. Thus, it is possible to cut only the backing layer, particularly in or around the area compressed by the pressing face, wherein none or merely a rest of adhesive matrix material of the laminate web remains. If the cutting tool and the embossing tool are fixed to each other, it is thus preferred that the cutting face protrudes in the cutting direction in relation to the embossing face. In other words, the cutting plane has a positive offset in relation to the pressing plane. In case the cutting tool and the embossing tool are coaxially moveable, the cutting face is arranged to protrude beyond the pressing face in the maximum deflection and/or maximum stroke position of the cutting face and the pressing face.

Preferably, the inner edge of the cutting face and the outer edge of the pressing face have essentially the same dimension, in particular the same diameter. For example, if the cutting face and the pressing face are arranged coaxially, particularly if the cutting face encircles the pressing face, cutting is performed closely to the pressing face and thus closely to the compressed area.

More particular, each dimension of the pressing face is between 80% to around 100% of the inner dimensions of the cutting face, whereby the dimensions are preferably diameters. For example, the inner dimensions of the cutting face are essentially equal to the outer dimensions of the cutting face, whereby the cutting face is preferably a thin edge. Particularly the outer dimensions of the pressing face are essentially equal to inner dimensions of the cutting face, whereby preferably the cutting face closely encircles the pressing face. Alternatively, the outer dimensions of the pressing face are around 95% to 99%, more particular 97%, of the inner dimensions of the cutting face. The inner dimensions of the pressing face are particularly around 80% to 98%, more particular 92%, of the inner dimensions of the cutting face. Preferably the cutting face is a cutting edge having an inner dimension corresponding essentially to the outer dimension. Particularly, if the cutting edge is circular it has a diameter of preferably 19.1 mm. Preferably the pressing face has the shape and/or cross section of a hollow cylinder. Particularly the hollow cylinder has an inner diameter of 17.6 mm and an outer diameter if 18.6 mm, whereby the pressing face has a width of 0.5 mm.

Another disclosure herein is an adhesive patch manufacturing apparatus, particularly a transdermal patch manufacturing apparatus. Preferably the manufacturing apparatus is a manufacturing apparatus for processing a laminate web. The manufacturing apparatus comprises a tool set with one or more features of the tool set described above. The manufacturing apparatus further comprises an actuation device for actuating the tool set. Preferably the actuation device comprises a spring assembly having at least one spring, in particular a disc spring. It is preferred that the actuation device actuates the tool set, particularly the embossing tool and/or the cutting tool in a stroking manner, to perform a stamping and/or a punching.

In a preferred embodiment the manufacturing apparatus further comprises a carrier plate. Particularly, the embossing tool and/or the cutting tool is connected to the carrier plate, more particularly integrally connected. For example, the cutting tool is integrally formed with the carrier plate and the embossing tool move coaxially relative to the cutting tool.

Another disclosure herein is an adhesive patch manufacturing system, particularly a transdermal patch manufacturing system. Preferably the manufacturing system is a manufacturing system for processing a laminate web. In a preferred embodiment the manufacturing system comprises a transport device. The transport device transports the laminate web and/or the adhesive patch to be manufactured through the manufacturing system. Alternatively or in addition, the transport device feeds materials to be processed, for example laminate web, into the manufacturing system. Alternatively or in addition, the transport device discharges materials from the manufacturing system, and/or transfers final and/or intermediate patches to a further processing stage. In particular, the transport device comprises one or more of: a powered roll, a conveying belt, a discontinuous conveyor, etc.

Another disclosure herein is a method of manufacturing adhesive patches, in particular transdermal patches. Preferably the method is performed using a tool set and/or a manufacturing apparatus with one or more of the features of a tool set and/or a manufacturing apparatus as described above. One step of the method resides in feeding a laminate web comprising a backing layer, a support layer, and an adhesive matrix layer arranged between the backing layer and the support layer, as input material. Another step, particularly a subsequent step, resides in pressing, in particular embossing, an edge area of the adhesive patch to be manufactured on the backing layer of the laminate web. In other words, this step creates a compressed contour or perimeter area of a adhesive patch to be manufactured. During the step of pressing, adhesive matrix material of the adhesive matrix layer arranged under the edge area is pressed out of the area. Particularly most of the adhesive matrix material or all adhesive matrix material is pressed out of the edge are, leaving none or significantly less adhesive matrix material. In addition or alternatively to pressing out adhesive matrix material, the pressing step comprises the bending and/or folding of the edge area of the backing layer around the adhesive matrix layer. Thus, it is possible to cover the perimeter of the adhesive matrix layer with the backing layer. Besides that, the method comprises another step particularly a subsequent step, of cutting out, in particular die-cutting, the adhesive patch to be manufactured. Cutting is performed particularly on the backing layer, in the edge area or outside the edge area, preferably on the outer perimeter of the edge area. Thus, after the cutting step it is possible to have an adhesive patch remaining having a compressed edge area with none or less adhesive matrix material, and/or having a covering of the adhesive matrix layer. Besides that, preferably, after cutting, a trellis made of backing layer remains.

Preferably the pressing step is performed before the cutting step. Besides that, it is possible to perform the pressing and the cutting step simultaneously or in all kinds of settings for the moving steps to meet the product necessaries. With particular preference, the pressing step is performed first, whereby during pressing cutting is performed. This process allows for optimum results when creating a uniform pressing and/or clean and efficient cutting.

Preferably, after the cutting step an adhesive patch intermediate product remains. Said adhesive patch intermediate product particularly comprises an adhesive layering cut into the shape of a final adhesive patch and having a pressed edge area. Further, said adhesive patch intermediate product comprises a support layer and optionally a trellis.

In a preferred embodiment the cutting step and/or the pressing step are carried out in a stroking manner, particularly by a stroking device.

More particularly, pressing and cutting are performed, preferably coaxially, in the same area, for example at the same location or spot. For example, the stroking device for cutting and the stroking device for pressing move coaxially, wherein preferably the stroking device for cutting moves peripherally to the stroking device for pressing. Thus, pressing and cutting can be performed in the same location and/or simultaneously.

It is preferred that the cutting is performed by cutting up to a support layer of a laminate web to be processed, preferably without cutting the support layer. Thus, it is possible to manufacture multiple patches, particularly comprising a backing layer and an adhesive matrix layer, on a single support layer. For example, the support layer can be used as a conveying means, whereby it is possible to separate the patches from the support layer.

A preferred additional, particularly subsequent, step resides in separating and/or removing the support layer and/or the trellis. Separating is preferably performed by peeling the support layer and/or the trellis, particularly from the rest of the laminate. In particular the support layer is separated from the adhesive layering comprising the cut-out shape as well as the trellis. The areas of the backing layer of the adhesive layering in contact with the support layer via the pressing are particularly separated from the backing layer and/or the support layer in a non-destructive manner. Said non-destructive separation is particularly possibly due to the loose connection created during pressing. The trellis is preferably separated from the support in a non-destructive manner as well.

In an additional and optional, step, the cut and pressed adhesive patch is transferred to, particularly onto, a release liner. The release liner particularly is a release liner which is separable, particularly peelable, from the adhesive patch before application. Transfer of the adhesive patch to the release liner is particularly performed during separation of the support, whereby it is preferred that the adhesive patch is directly passed from the support layer to the release liner, for example in an area where the support layer in the release line run on separate rolls adjacent to each other.

In a preferred embodiment an additional, preferably subsequent step resides in packaging the adhesive patch comprising the shaped adhesive layering as well as the release liner. Packaging is particularly performed by covering both sides of the adhesive patch with pouching material. The final result of the step particularly provides a primary packaged adhesive patch.

The features described above in the context of the different disclosures can be applied and/or combined with each other. Besides that, the features of the following figures and the corresponding description can be applied and/or combined individually or jointly with the different disclosures as well.

The disclosure will be explained in greater detail hereunder by way of a preferred embodiment with reference to the accompanying drawings.

BRIEF DESCRIPTION OF THE DRAWINGS

The following is shown:

FIG. 2a-2c schematic diagrams illustrating a method of manufacturing adhesive patches in accordance with the disclosure;

FIG. 12 a detailed view of FIG. 7;

DETAILED DESCRIPTION

Figure 1:
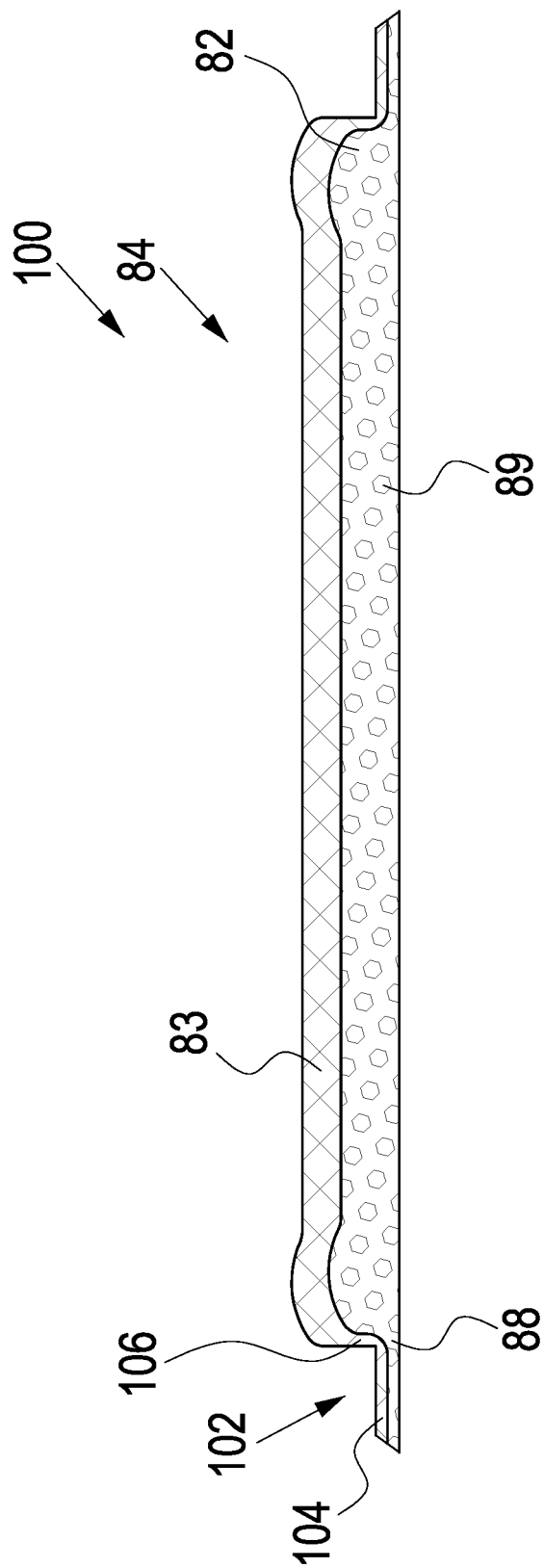
FIG. 1 a schematic diagram of an embodiment of an adhesive layering according to the disclosure.

FIG. 1 shows an adhesive layering, in particular a transdermal adhesive layering 100.

The adhesive layering 100 comprises a backing layer 83 and an adhesive matrix layer 82. The adhesive matrix layer 82 comprises adhesive matrix material 89. The backing layer 83 has a larger size, in particular a larger perimeter, than the adhesive matrix layer 82, wherein an edge area 104 in an overlapping area 102 of the adhesive layering 100 and/or of the backing layer 83 overlaps the adhesive matrix layer 82. The edge area 104 has a bending 106 which covers the adhesive matrix layer 82, particularly the perimeter of the adhesive matrix layer 82.

The overlapping area 102 comprises a compressed or embossed area 88, synonymously pressure zone 88, being pressed (see for example FIGS. 2a-2c). Thus, the pressure zone 88 comprises none or significantly less adhesive matrix material.

The adhesive layering 100 of FIG. 1 has the shape of a final adhesive patch 84. Thus, it corresponds to an adhesive patch.

FIGS. 2a-2c schematically show a method of manufacturing adhesive patches 108, in particular transdermal patches.

FIG. 2a shows a laminate web 80 as basic material for manufacturing adhesive patches. Particularly the laminate web 80 is continuous, wherein only a fragment is shown in the Figure. The support layer 81 is connected to the adhesive matrix layer 82. Particularly the laminate web 80 rests on a base plane (not identified by a reference numeral). The laminate web 80 comprises an adhesive layering 100 (substantially in accordance with FIG. 1) as well as a support layer 81.

FIG. 2b schematically shows a pressing step using an embossing tool 31 symbolized by the two arrows 31. The laminate web 80 is embossed by the embossing tool 31 creating a pressure zone 88 in the edge area (see also FIGS. 1 and 12 as well as the corresponding descriptions).

FIG. 2c schematically shows a cutting step after the pressing step by use of a cutting tool 51 symbolized by the two arrows 51. The laminate web 80 is cut by the cutting tool 51, thereby creating a cutting notch 110. Cutting is performed only up to the support layer 81, leaving the support layer unharmed (see also FIG. 12 as well as the corresponding description).

After the cutting step an adhesive patch intermediate product 108 comprising the cutout 84 of the laminate web 80, the complete support layer 81 as well a trellis 85 comprising the cutting scrap 85', 85" remains. The support layer 81, which is connected to the trellis 85, in the context of this text, is not part of the trellis, but of the intermediate product 108. The trellis 85 merely comprises the cutting scrap of the backing layer 83 as well as of the adhesive matrix layer 82.

The cutout 84 of the adhesive patch intermediate product 108 has the shape of a final adhesive patch. Thus, the cutout 84 particularly corresponds to an adhesive patch 84.

Figure 3:
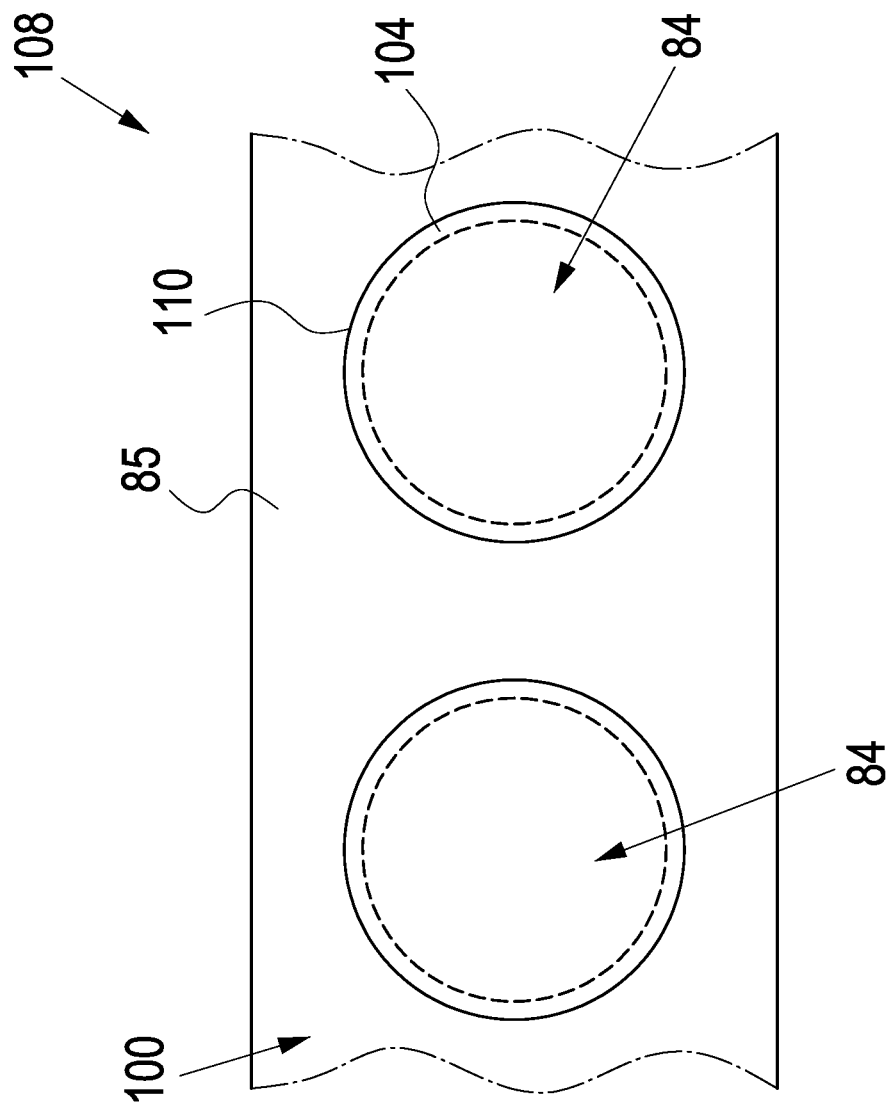
FIG. 3 a schematic diagram of an embodiment of an adhesive patch intermediate product according to the disclosure.

FIG. 3 schematically shows an adhesive patch intermediate product 108 comprising a pressed and cut adhesive layering 100. Thus, the adhesive patch intermediate product 108 comprises adhesive patches 84 having embossed edge areas 104 which are separated from the remaining adhesive layering 100, i.e. the trellis 85, by a cut 110. The trellis 85 as well as the adhesive patches 84 are arranged on the support layer 18 (not shown) of the adhesive layering 100.

Figure 4:
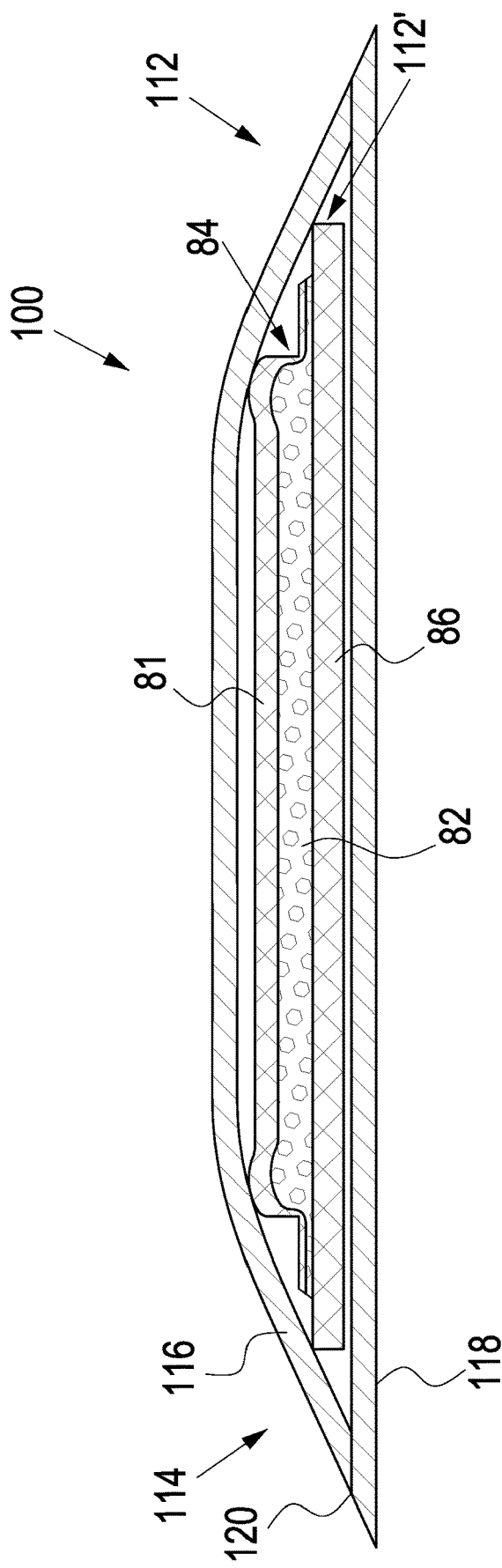
FIG. 4 a schematic diagram of an embodiment of adhesive patch product according to the disclosure.

FIG. 4 schematically shows an adhesive layering 100 in form of an adhesive patch product 112. The adhesive patch product 112 comprises one adhesive patch 84, which substantially corresponds to the adhesive patch 84 of FIG. 1. The adhesive patch 84 is, particularly loosely, more particularly peelably, connected to a release liner 86. Particularly in contrast to a continuous support layer 81 (see for example FIG. 2c), the release liner 86 has a similar size as the adhesive patch 84. The adhesive matrix layer 82 is arranged between the release liner 86 and the backing layer 81 of the adhesive layering.

The adhesive patch product 112 of FIG. 4 further comprises a primary packaging 114. However, the adhesive patch 84 and the connected release liner 86 also represent an adhesive patch product on its own, which is thus depicted by reference numeral 112'.

The primary packaging 114 comprises two layers, a top layer 116 and a bottom layer 118. The two layer 116, 118 are bonded, particularly sealed by a bonding 120. Preferably the packaging fully covers the adhesive patch 84 and the connected release liner 86. Thus, the packaging preferably forms a pouch 114, wherein, for example, the pouch is a tear-open pouch.

Figure 5:
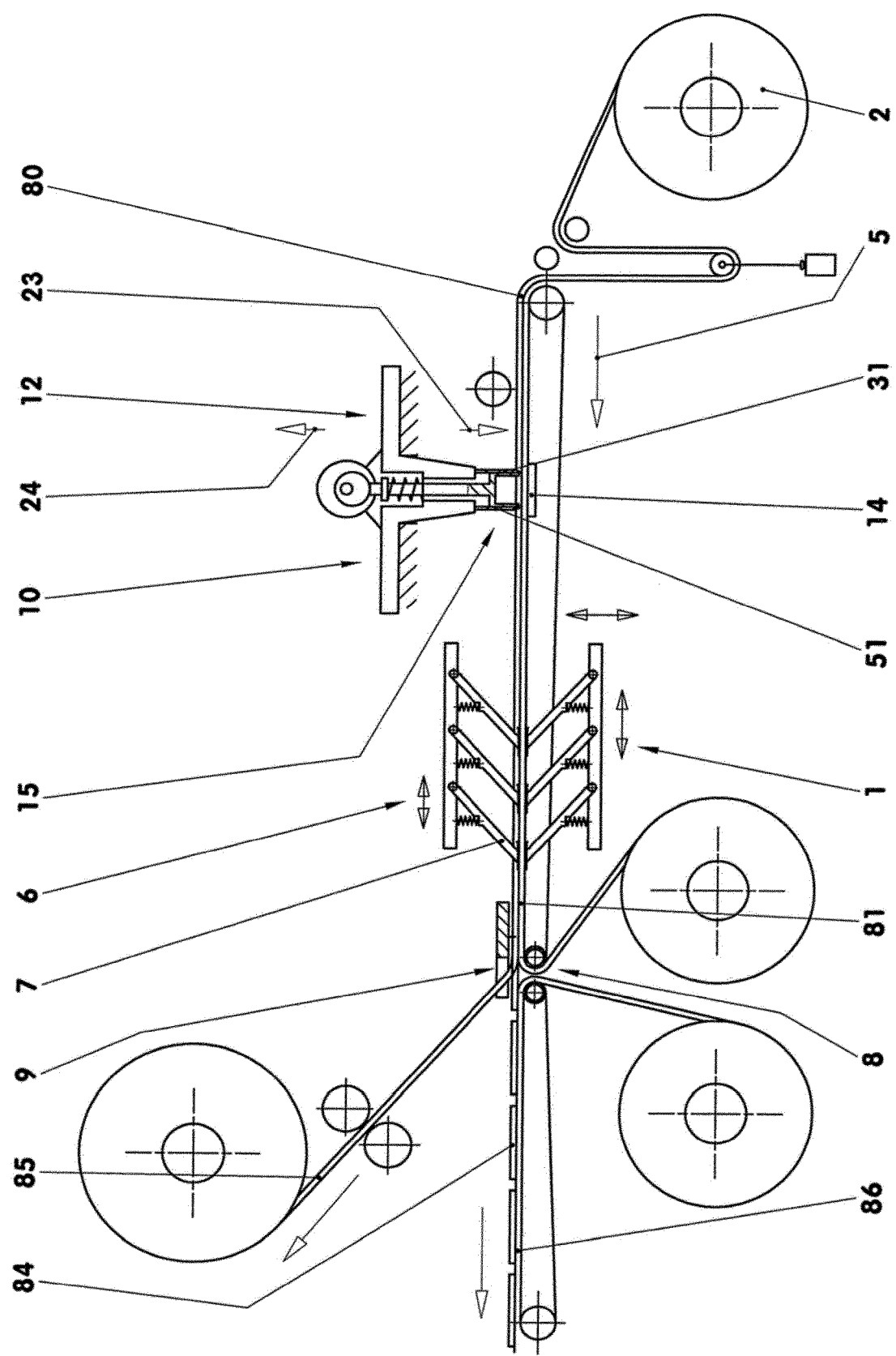
FIG. 5 a schematic diagram of an embodiment of an adhesive patch manufacturing system according to the disclosure.

FIG. 5 shows an adhesive patch manufacturing system 1. Particularly the adhesive patch manufacturing system 1 is a manufacturing system for processing adhesive layering-containing laminate webs 80. The individual laminate web 80 is unwound from a roll (2) by means of a conveying device 6 and transported in a conveying direction 5. The conveying device 6 is a non-continuous conveyor 6, which grips the material to be conveyed and transports it by a preset amount in the direction of a transfer station 8. After the gripping device 7, which is configured for example in the manner of tongs, is released, it moves back into the starting position, where the next conveying cycle starts.

Arranged for example between the roll 2 and the conveying device 6 is an adhesive patch manufacturing apparatus 10. This adhesive patch manufacturing apparatus 10 preferably is a cutting and embossing apparatus. At this adhesive patch manufacturing apparatus 10, the laminate web 80 of multilayer construction is regionally compressed by means for example of a tool unit 15 and is cut through in certain areas. The tool unit 15 illustrated in FIG. 5 comprises a tool set 30 which has an embossing tool 31 and a cutting tool 51, cf. FIGS. 6-13. These tools 31, 51 each have closed processing contours lying in a plane. At a subsequent stripping station 9, the regions of the laminate web 80 that are enclosed by the cutting tool 51 during the working stroke remain as adhesive layerings 100 in the shape of final adhesive patches 84 on a support layer 81 of the laminate web 80, while the remaining trellis, particularly the surrounding punching scrap 85 is pulled off.

At the transfer station 8, the adhesive patches 84 are transferred from the support layer 81 onto a release liner 86 and fed for example to a further processing and a packaging station.

Figure 6:
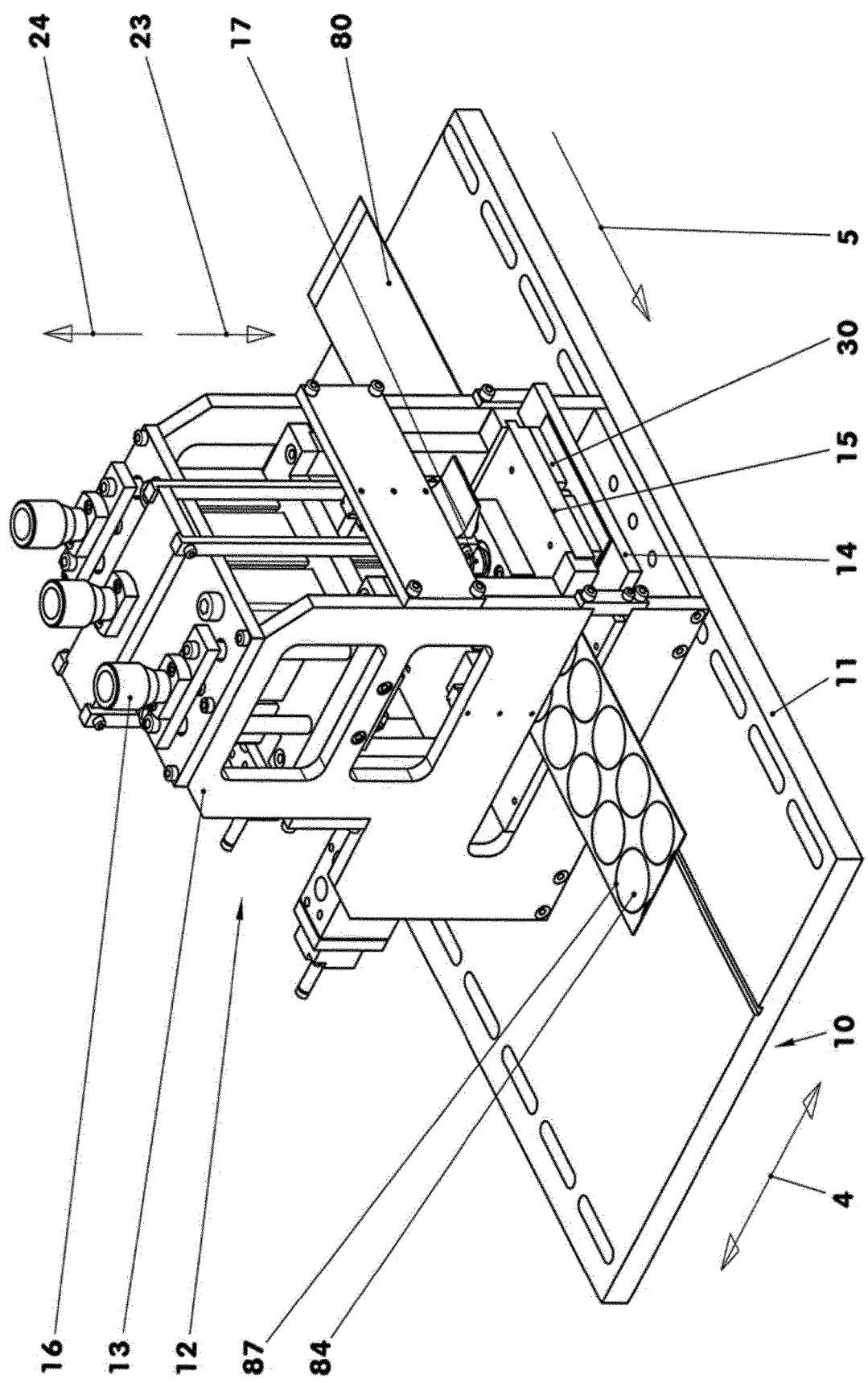
FIG. 6 a diagram of an embodiment of an adhesive patch manufacturing apparatus according to the disclosure.

FIG. 6 shows a manufacturing apparatus 10. It has for example a press 12 that is fastened for example to a base plate 11. The press 12 has a rigid press frame 13 in which a counterpressure plate 14 lying in a base plane lying for example parallel to the base plate 11 is arranged. Also mounted in the press frame 13 is a tool unit 15. This tool unit 15 is movable relative to the press frame 13 in a direction normal to the counterpressure plate 14 from a rest position 21, cf. FIG. 9, into a working position 22, cf. FIG. 11, and back. The direction of movement of the tool unit 15 in the direction of the counterpressure plate 14 is referred to as working stroke direction 23 in the following text. The opposite direction, i.e. from the working position 22 into the rest position 21, is the return stroke direction 24.

In the press 12, it is possible to set for example the pressing stroke, the pressing force and the position of the tool set 30, comprising one or more tools 31, 51, of the tool unit 15. To this end, the press 12 has for example three particularly manually settable setting screws 16. In the exemplary embodiment in FIG. 6, the tool set 30 is configured to be reusable. During a tool stroke, a plurality of adhesive layerings 100 in the shape of final adhesive patches 84 having compressed edge areas are in this case produced on the laminate web 80 at the same time. The tool set 30 can also be configured for single use, however.

In the illustrations in FIGS. 5, 6 and 9-12, the laminate web 80 rests on the counterpressure plate 14 and is conveyed through the press 12 in the conveying direction 5. The laminate web 80 is conveyed in this exemplary embodiment when the tool unit 15 is in the rest position 21. The tool set 30 is then located above the laminate web 80. The entire tool unit 15 is actuable in the press 12 by an actuation device, for example by means of a pressure cylinder 17. Thus, in this exemplary embodiment, this pressure cylinder 17 actuates both the cutting tool 51 and the embossing tool 31.

Figure 7:
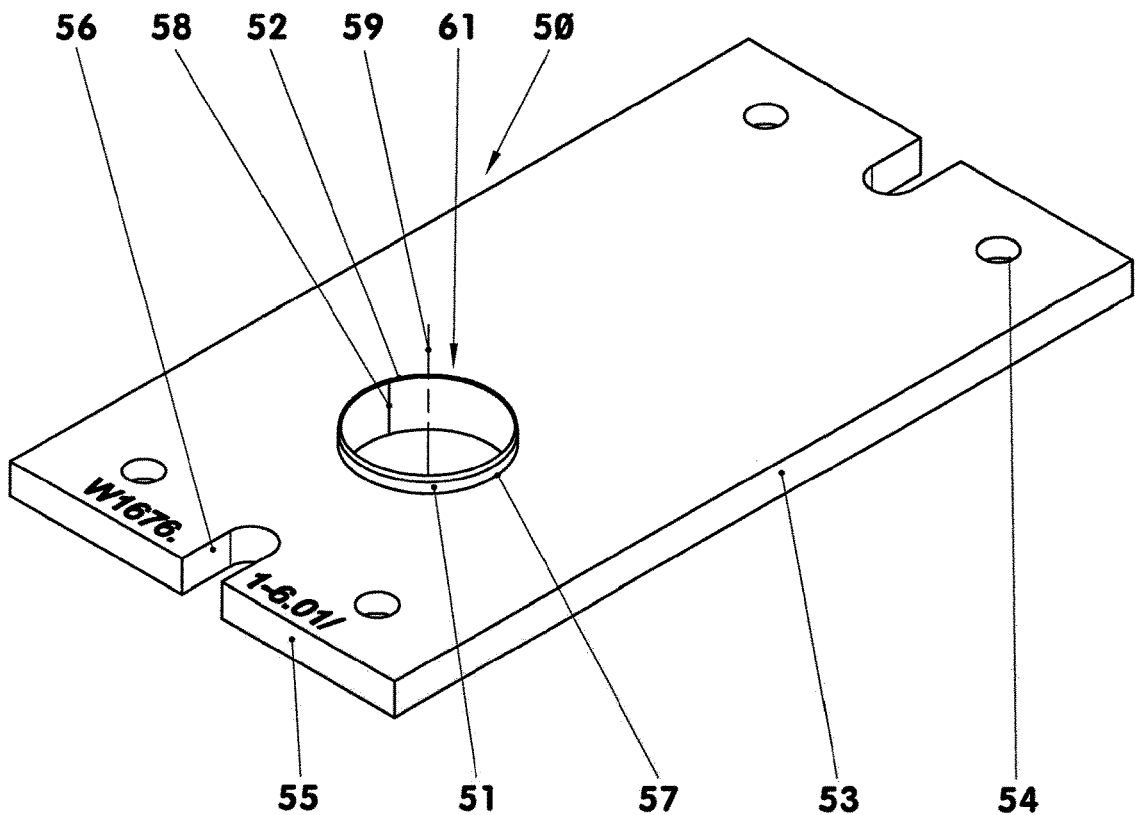
FIG. 7 a diagram of an embodiment of a cutting tool according to the disclosure.

FIG. 7 illustrates a cutting tool unit 50 in the form of a punching tool unit. It comprises a carrier plate 53 and a cutting tool 51, inserted into the carrier plate 53, in the form of an annular blade 51. The carrier plate 53 is produced in the exemplary embodiment from an aluminum-magnesium alloy, for example AlMg4,5Mn with the material number 3.3547. It has a rectangular base area and a thickness of for example 8 millimeters. In the region of the corners, the carrier plate 53 has countersunk through-holes 54. Furthermore, recesses 56 have been introduced at the end sides 55. Arranged in the vertical longitudinal centre plane of the carrier plate 53 is a tool aperture 57 with a circular cross-sectional area.

In this tool aperture 57, the annular blade 51 is fitted for example in a force-fitting manner. Said blade is produced from a rolled steel strip and has a hardness of for example 66 HRC. If appropriate, the cutting tool 51 is reinforced by means of a rear wall made of stainless steel. A butt joint 58 extends parallel to the central axis 59 of the annular blade 51. The annular blade 51 has, around its circumference, a constant height oriented normally to the carrier plate 53. In the exemplary embodiment, its thickness is 0.5 millimeter. For example, the annular blade 51 protrudes downwards, i.e. in the working stroke direction 23, out of the carrier plate 53 with its edge side 61 by a third of its height.

The cutting tool 51 comprises a cutting face 52. The cutting face 52 particularly is a circumferential cutting edge, e.g. bounded by an inner flank 62 and an outer flank 63, cf. FIG. 12. The cutting edge 52 lies in a cutting plane normal to the working stroke direction 23. This plane is referred to as cutting plane in the following text. The edge angle is for example 40 degrees. In this case, in the illustrations in FIGS. 7 and 12, the inner flank 62 encloses an angle of 30 degrees with the return stroke direction 24, which is oriented in the opposite direction to the working stroke direction 23. The inner flank 62 is thus formed in a frustoconical manner. The imaginary cone tip lies on the central axis 59 of the cutting tool 51 and is offset in the return stroke direction 24 with respect to the cutting edge 52. This inner flank 62 is referred to as second working face 62 in the following text. The cutting edge 52 extends centrally with respect to the thickness of the annular blade 51. The outer flank 63, referred to as third working face 63 in the following text, is likewise formed in a frustoconical manner. The imaginary cone tip of the associated cone is offset in the working stroke direction 23 with respect to the cutting edge 52. The inner face 64 of the annular blade 51 lies for example within a tolerance zone K7 according to ISO 286 around its nominal dimension.

Figure 8:
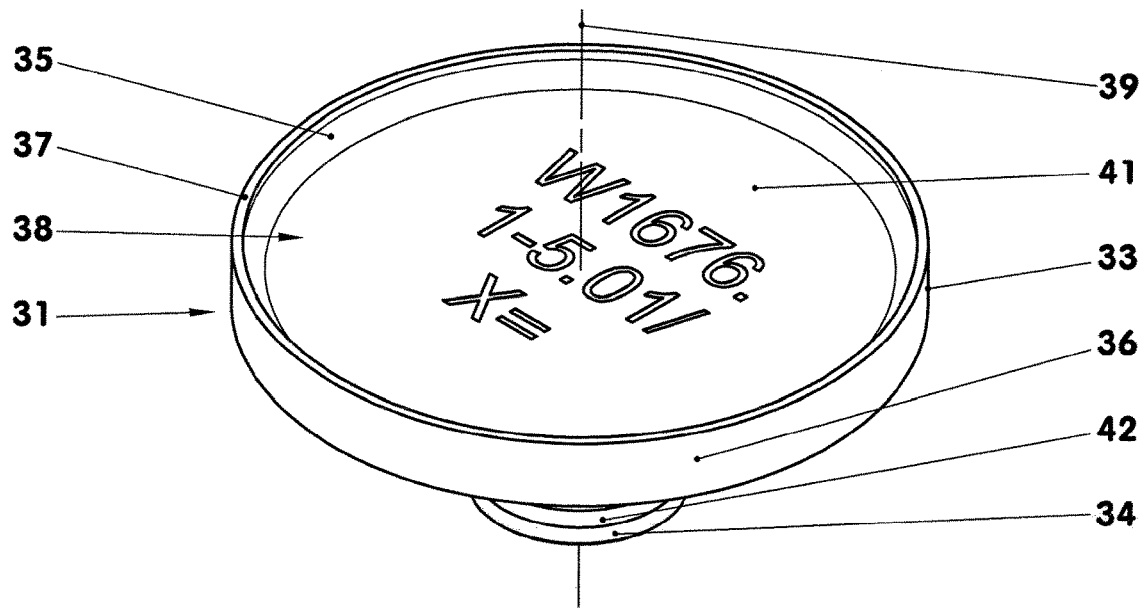
FIG. 8 a diagram of an embodiment of an embossing tool according to the disclosure.

FIG. 8 shows an embossing tool 31. This is formed in a rotationally symmetric manner with respect to a central axis 39 oriented parallel to the working stroke direction 23. The embossing tool 31 is formed in the manner of a stamp. It has an embossing plate 33 and a central guide rod 34 attached thereto. In the exemplary embodiment, the embossing tool 31 is produced from an austenitic steel, for example X5CrNi18-10 with the material number 1.5301. The outside diameter of the embossing plate 33 forms a clearance fit with the inside diameter of the annular blade 51. The clearance is for example between 0.4% and 1.2% of the nominal diameter of the pair made up of the embossing tool 31 and annular blade 51. The clearance of the pair is less than 2% of the nominal diameter of the pair. The nominal diameter of the pair is the nominal inside diameter of the annular blade 51.

The embossing plate 33 has a circumferential peripheral lip 35 facing away from the guide bar 34. This peripheral lip 35 is flush with the lateral face 36 of the embossing tool 31. In the working stroke direction 23, an end face 37 bounds the peripheral lip 35. This end face 37 is arranged normally to the central axis 39 of the embossing tool 31. It is referred to as pressing face or synonymously first working face 37 in the following text and lies in a working-face plane. In the exemplary embodiment, the thickness of the peripheral lip 35 is 2.6% of the diameter of the embossing plate 33. The height of the embossing plate 33 in a direction normal to the plane of the first working face 37 is for example seven times the thickness of the peripheral lip 35.

The peripheral lip 35 encompasses a receiving space 38. The latter has for example a largely planar surface 41. The latter is parallel to the first working face 37 and is spaced apart therefrom in the return stroke direction 24 by three times the thickness of the peripheral lip 35. The surface 41 can have an inscription, for example a tool designation. The lateral face 36, the first working face 37 and the boundary faces of the receiving space 38 can be provided with a non-stick coating, for example silicone hybrid polymer.

The guide rod 34, formed particularly integrally with the embossing plate 33, has a cylindrical shape. Its diameter is for example 21% of the diameter of the embossing plate 33. In the exemplary embodiment, the length of the guide rod 34 is 55% of the diameter of the embossing plate 33. At its end remote from the embossing plate 33, the guide rod 34 has a circumferential annular groove 42. In the installed state of the embossing tool 31, the guide rod 34 is guided for example in a sliding bush 44.

Figure 9:
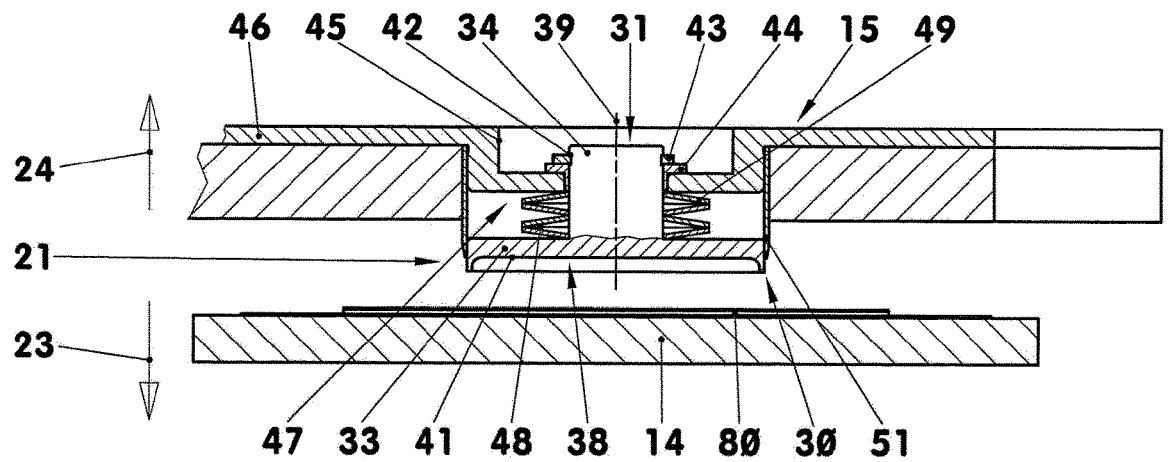
FIG. 9 a diagram of an embodiment of a tool set in accordance with the disclosure in the first position.
Figure 10:
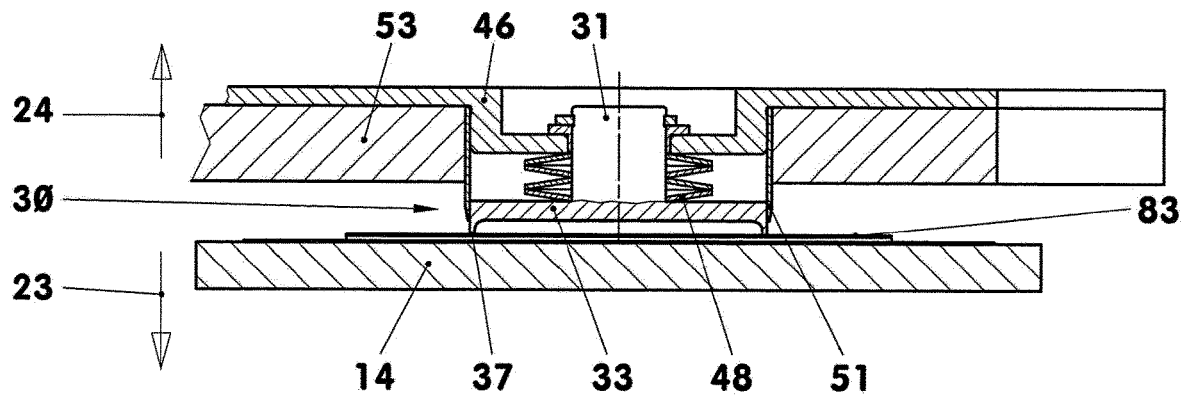
FIG. 10 a diagram of an embodiment of a tool set in accordance with the disclosure in a second position.
Figure 11:
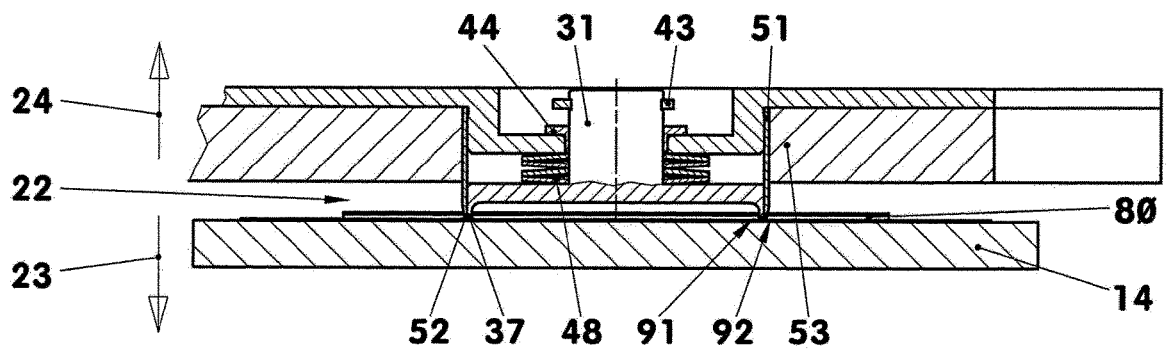
FIG. 11 a diagram of an embodiment of a tool set in accordance with the disclosure in a third position.
Figure 11:
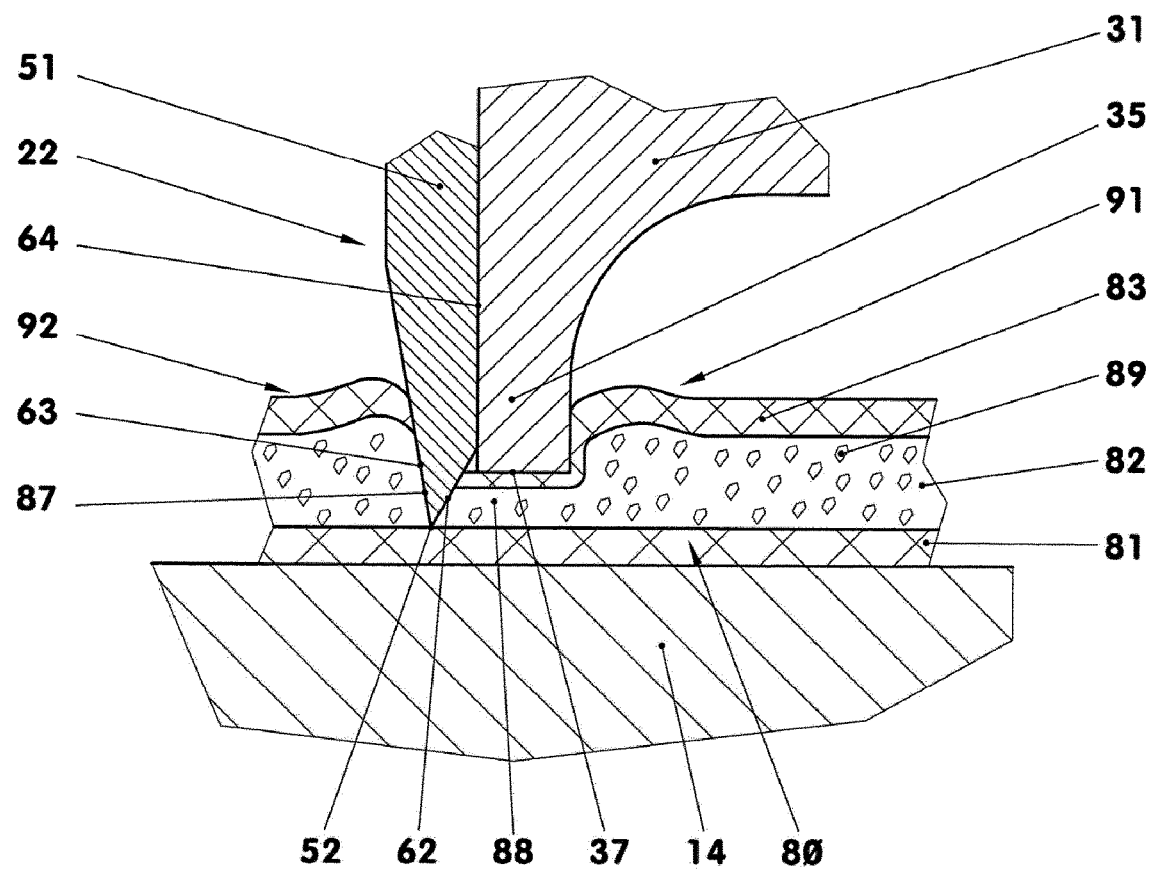

FIGS. 9-11 illustrate the use of a tool set 30. These illustrations show sectional views, the section plane of which lies normally to the conveying direction 5. In this case, in FIG. 9, the tool set 30 is in a first, rest position 21. In this rest position 21, both the cutting tool 51 and the embossing tool 31 are spaced apart from the laminate web 80. The embossing tool 31 and the annular blade 51 are arranged coaxially with one another in these illustrations. The cutting edge 52 of the cutting tool 51 has a contour that conforms with the first working face 37 of the embossing tool 31. The central axes 39, 59 of the two rotationally symmetric tools 31, 51 lie on a common straight line. Each internal dimension of the first working face 37 in the working-face plane is between 80% and 98% of the dimension, parallel thereto, of the cutting edge 52 in the cutting-edge plane. In the case of tools 31, 51 configured in the form of a circular ring, these dimensions can be diameters. For example, with an increasing ratio of said dimensions with respect to one another, the force to be applied to the first working face 37 in order to achieve a desired degree of compression will decrease. The ratio of the internal dimension of the first working face 37 and the dimension, parallel thereto, of the first cutting edge 52 can also lie between 83% and 98%. In the exemplary embodiment, the ratio of the inside diameter of the first working face 37 to the diameter of the cutting edge 52 in the cutting plane is 95%. This ratio is in the range between 80% and 98%.

The width of the first working face 37 in a plane normal to the working stroke direction 23 corresponds for example to at least half the difference between the outside diameter of the third working face 63 and the inside diameter of the second working face 62. The width of the first working face 37 is for example at least 0.3 millimeters and at most 1.25 millimeters, preferably 0.5 millimeters. In the exemplary embodiment, the width of the first working face 37 corresponds to the thickness of the cutting tool 51.

The embossing tool 31 bears on the sliding bush 44 with a supporting ring 43 inserted into the annular groove 42. This sliding bush 44 sits in a depression 45 of a bearing plate 46. The bearing plate 46 bears on the carrier plate 53 and is for example screwed together therewith. Arranged between the supporting side 47, oriented in the working stroke direction 23, of the depression 45 and the embossing plate 33 is for example an actuation device, particularly in form of a disc spring assembly 48 having four disc springs 49. These disc springs 49 are fitted on the guide rod 34 and are guided thereon. In the illustration in FIG. 9, the disc spring assembly 48 is not loaded. The embossing tool 31 thus hangs on the bearing plate 46. In the rest position 21, the embossing tool 31 protrudes in the working stroke direction 23 beyond the cutting edge 52 of the annular blade 51.

The laminate web 80 is for example a composite material 80 formed from three layers. The bottom-most layer is a support layer 81 with a thickness between 75 micrometers and 100 micrometers. In the width-wise direction 4, oriented transversely to the conveying direction 5, the width is for example 75 millimeters. In the exemplary embodiment, the support layer 81 consists of polyethylene terephthalate (PET). It is provided for example with adhesive properties.

To the support layer 81 there adheres an adhesive matrix layer 82. This matrix layer 82 can additionally contain active substances. In the width-wise direction 4, the width of the matrix layer 82 is for example two-thirds of the width of the support layer 81. The support layer 81 protrudes on both sides beyond the adhesive matrix layer 82 arranged symmetrically with respect to the vertical longitudinal center plane thereof. The matrix layer 82 has for example a thickness of between 100 micrometers and 500 micrometers. The elongation at break of the adhesive matrix layer 82 is for example greater than 50%; it is for example between 50% and 100%. The modulus of elasticity is for example less than 30 Newton per square millimeter.

The adhesive matrix layer 82 is covered by means of a backing layer 83. The backing layer 83 can be produced from the same material as the support layer 81. It has a thickness of for example 23 micrometers. Its tearing strength is for example 50 Newton per centimeter. The tearing strength, which is the length-related force at which a tear starts, is between 100 Newtons per centimetre and 140 Newton per centimetre. The elongation at break is between 80% and 120%. These values correspond for example to the values of the support layer 81. The backing layer 83 can be provided with adhesive properties at least on the side facing away from the adhesive matrix layer 82.

In order to produce the embossed edge 87 in the laminate web 80, the tool unit 15 with the tool set 30 is moved in the working stroke direction 23. The embossing tool 31 continues to project in the working stroke direction 23 beyond the cutting edge 52 of the annular blade 51. During this working stroke, the first working face 37 comes into contact with the backing layer 83 of the laminate web 80, cf. FIG. 10. In this second, instantaneous, for example transient intermediate position, the disc spring assembly 48 is not deformed. The annular blade 51 continues to be spaced apart from the laminate web 80.

During the further travel of the tool unit 15 in the working stroke direction 23, the first working face 37 remains on the backing layer 81. The disc spring assembly 48 is loaded, such that the pressure force on the backing layer 83 that is transmitted from the first working face 37 is increased. The backing layer 83 is deformed regionally in the working stroke direction 23 and in the process displaces adhesive matrix material 89 within the adhesive matrix layer 82. The overlapping area 102 comprises a pressure zone 88, which is for example in the form of a circular ring, adhesive matrix material 89 is displaced both into the inner region 91 bounded by the peripheral lip 35 and into the outer region 92. The adhesive matrix material is pushed out of the pressurized edge.

With increasing travel of the tool unit 15 in the working stroke direction 23, the force on the backing layer 83 increases in the region of the peripheral lip 35. Further adhesive matrix material 89 is displaced into the inner region 91 and into the outer region 92. The annular blade 51 travels along the embossing tool 31. It comes into contact with the backing layer 83 and cuts through the latter. The second working face 62 can, on account of its geometric design, displace substrate 89 into the pressure zone 88 of the laminate web 80. If appropriate, the adhesive matrix layer 82 can be solidified in this region.

The third working face 63 likewise penetrates into the laminate web 80. On account of the geometric design of this third working face 63, the adhesive matrix material 89 is displaced into the outer region 92 only a little.

FIG. 11 shows the tool unit 15 in a third, working position 22, which corresponds to the maximum stroke deflection position. FIG. 12 illustrates a detail of this FIG. 11 in the region of the cutting edge 52. The embossing tool 31 presses onto the laminate web 80 and compresses it. The laminate web 80 bulged slightly in the region internally adjoining the peripheral lip 35. The disc spring assembly 48 has been deformed. The carrier plate 53 has moved in the working stroke direction 23 relative to the embossing tool 31. The guide rod 34 projects out of the bearing plate 46. The supporting ring 43 is spaced apart from the sliding bush 44.

The annular blade 51 cut through the backing layer 83 and the adhesive matrix layer 82. In this working position 22, the cutting edge 52 is spaced apart from the counterpressure plate 14 i.e. the base plane at least by the thickness of the support layer 81. The cutting edge 52 is in this case offset in the working stroke direction 23 with respect to the first working face 37. The amount of this offset is greater than or equal to the thickness of the backing layer 83. The position of the cutting edge 52 in the working position 22 can be path-controlled and/or pressure-controlled relative to the counterpressure plate 14. Away from the annular blade 51, the laminate web 80 can have bulged.

From the working position 22 the tool set 30 is raised in the return stroke direction 24. During the raising of the carrier plate 53, the annular blade 51 is moved relative to the laminate web 80 and to the still bearing embossing tool 31. The disc spring assembly 48 is relieved of pressure.

During the further raising of the carrier plate 53, the annular blade 51 completely leaves the envelope contour of the laminate web 80. The embossing tool 31 also lifts off the laminate web 80. On the support layer 81, there remain the disc-like adhesive layerings 100, particularly adhesive patches 84, each bounded by an embossed edge 87, and the punching scrap 85.

The tool set 30 can also be configured such that the annular blade 51 and the embossing tool 31 are individually movable in the working stroke direction 23 and in the return stroke direction 24. Given a coaxial arrangement of the two tools 31, 51, the two tools 31, 51 can be actuated at the same time or in a temporally offset manner with respect to one another. The press 12 has for this purpose for example two individually controllable pressure cylinders. The two pressure cylinders are controlled for example pneumatically via electromagnetically actuated 5/2-way valves with a spring reset. For the return stroke, it is possible for example first of all for the pressure cylinder which controls the embossing tool 51 to be switched over. The embossing tool 51 relieves the load on the laminate web 80. Subsequently, by means of the multi-way valve connected upstream, the other pressure cylinder is switched over such that the annular blade 31 is moved in the return stroke direction 24.

In a press 12 with individually controllable pressure cylinders, it is possible for example for both the travel of the individual tools 31, 51 and the pressure of the individual tools 31, 51 on the laminate web 80 to be controlled individually. Once the working position 22 has been reached, it is possible, even in the case of such control, first of all for the pressurization of the laminate web 80 by the working face 37 to be reduced before the cutting tool 51 with the cutting edge 52 is moved in the return stroke direction 24.

In an arrangement of the tool set 30 as a progressive tool, the embossing tool 31 is connected upstream of the annular blade 51. For example, the laminate web 80 is then conveyed in the conveying direction 5 from an embossing station to a cutting station. The outside diameter of the embossing tool 31 can in this case be greater than the diameter of the cutting edge 51.

Figure 13:
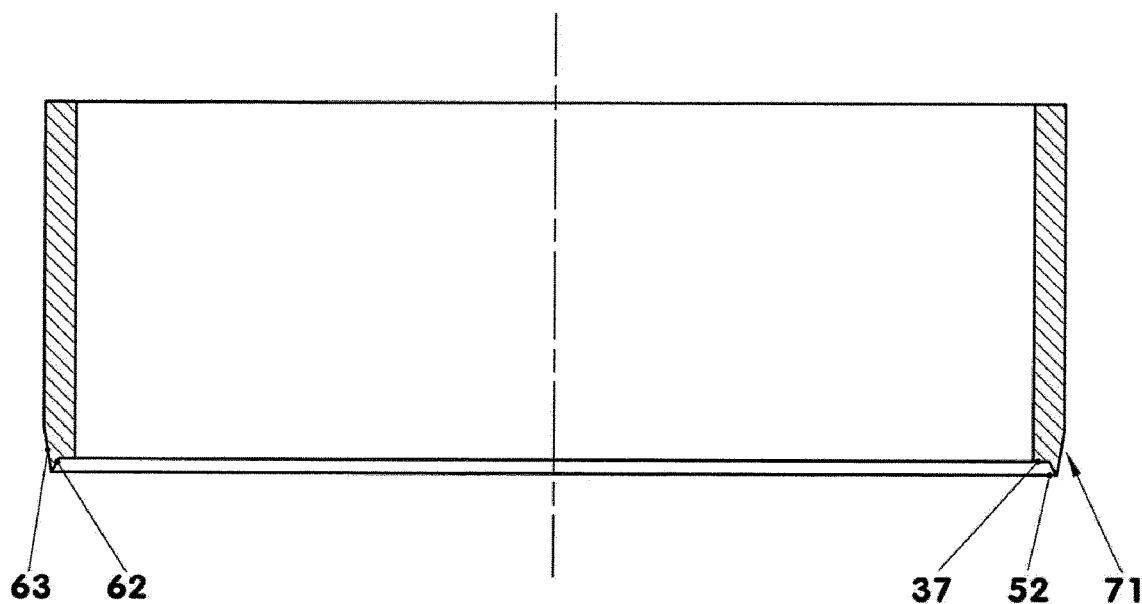
FIG. 13 a diagram of an embodiment of a tool set in accordance with the disclosure.

FIG. 13 shows a tool set 30 having a combined tool 71. This annular tool 71 has a cutting edge 52 and three working faces 37, 62, 63 formed coaxially therewith. The first working face 37 is arranged within a cylinder formed by the cutting edge 52. This first working face 37 is in the form of a planar face and lies parallel to a plane defined by the cutting edge 52. It is offset with respect to this cutting plane in the return stroke direction 24. For example, the distance of the plane of the cutting edge 52 from the first working face 37 is less than the sum of the thicknesses of the adhesive matrix layer 82 and the backing layer 83. The inside diameter of the first working face 37 in the working-face plane is in this illustration 95% of the diameter of the cutting edge 52 in the cutting plane parallel thereto.

The second working face 62 and the third working face 63 are configured for example as described in conjunction with the previous exemplary embodiment. The intersection of these working faces 62, 63 forms the cutting edge 52.

The use of this tool set 30 is as described in conjunction with the first exemplary embodiment.

Combinations of the mentioned exemplary embodiments are also conceivable.

The invention claimed is:

1. A method of manufacturing adhesive patches using a tool set, wherein the tool set comprises: a cutting tool; and an embossing tool, wherein the cutting tool and the embossing tool are coaxially moveable relative to each other, the method comprising the steps of:
   a) feeding a laminate web comprising a backing layer, a support layer, and an adhesive matrix layer arranged between the backing layer and the support layer, as input material;

b) pressing an edge area of the adhesive patch to be manufactured on the backing layer thereby pressing out adhesive matrix material under the edge area and bending the edge area around the adhesive matrix layer; and c) cutting out the adhesive patch to be manufactured by cutting the backing layer outside the edge area.

2. The tool set for manufacturing adhesive patches of claim 1, wherein the cutting tool has a cutting face lying in a cutting plane; and the embossing tool has a pressing face lying in a pressing plane, wherein the cutting plane and the pressing plane are parallel, wherein the embossing tool is configured to press an edge area shape of the adhesive patch to be manufactured, and wherein the cutting tool is configured to cut out the adhesive patch to be manufactured by cutting along the edge area.

3. The tool set according to claim 2, wherein the cutting face and the pressing face have a ring shape.

4. The tool set according to claim 2, wherein the cutting face and/or the pressing face have a recessed height offset in the cutting position, whereon, the laminate web is arranged, and wherein the cutting face has a protruding height offset in relation to the pressing face at least in the cutting position, whereby the height offset of the cutting face in relation to the pressing face is of the height of a backing layer of the laminate web.

5. The tool set according to claim 2, wherein the inner edge of the cutting face and the outer edge of the pressing face have essentially the same dimension, wherein the inner dimension of the pressing face is between 80% to 98% of the inner and outer dimensions of the cutting face, and wherein the dimensions are preferably diameters.

6. The method according to claim 1, wherein cutting is performed by cutting up to the support layer.

7. The method according to claim 1, further comprising the steps of:

d) removing, in particular peeling, the support layer;

e) transferring and connecting the adhesive patch to a release liner; and f) packaging.

8. An adhesive layering manufactured by the method according to claim 1 comprising:

a backing layer; and an adhesive matrix layer, wherein the adhesive matrix layer is arranged on one side of the backing layer, and wherein the backing layer has a larger size than the adhesive matrix layer.

9. The adhesive layering according to claim 8, wherein the backing layer overlaps the adhesive matrix layer.

10. The adhesive layering according to claim 8, wherein the overlapping area of the backing layer is an edge area of the backing layer, and wherein the edge area is contact with less of the adhesive matrix material than the rest of the backing layer.

11. The adhesive layering according to claim 9, wherein the overlapping area covers the perimeter of the adhesive matrix layer and is bend around the adhesive matrix layer.

12. The adhesive layering according to claim 9, wherein the area of the adhesive layering in the overlapping area has an embossing, wherein the embossing forms the covering and bending of the backing layer around the adhesive matrix layer; and wherein the embossing forms a pressed-out area of the adhesive matrix material in contact with the overlapping area.

13. The adhesive patch intermediate product comprising:
at least one adhesive layering according to claim 8; and
a support layer,
wherein the at least one adhesive layering is arranged on the support layer, wherein the adhesive matrix layer of the adhesive layering is arranged between the support layer and the backing layer of the adhesive layering, and wherein the overlapping area is in loose contact with the support layer.

14. The adhesive patch product comprising:
an adhesive layering according to claim 8; and
a release liner,
wherein the adhesive matrix layer is arranged between the backing layer and the release liner, and wherein the overlapping area is in loose contact with the release liner.

15. The tool set according to claim 2, wherein the cutting face is arranged circumferential to the pressing face.

16. The tool set according to claim 2, wherein the cutting tool and the embossing tool are moveable in a stroking manner.

17. The tool set according to claim 2, wherein the cutting face and the pressing face have a recessed height offset in the maximum stroke deflection position to a basis plane.

* * * * *